June 4, 1940.  W. O. SCHULTZ  2,203,066
CABLE ANCHORING DEVICE
Filed April 28, 1937  2 Sheets-Sheet 1
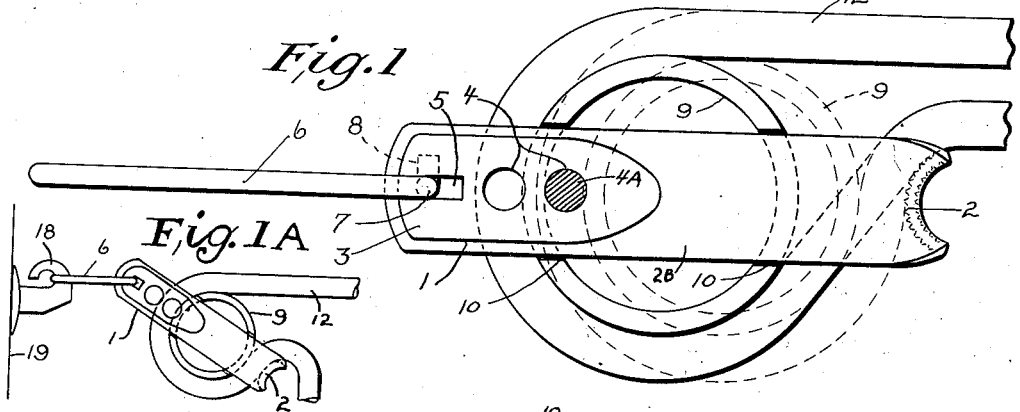
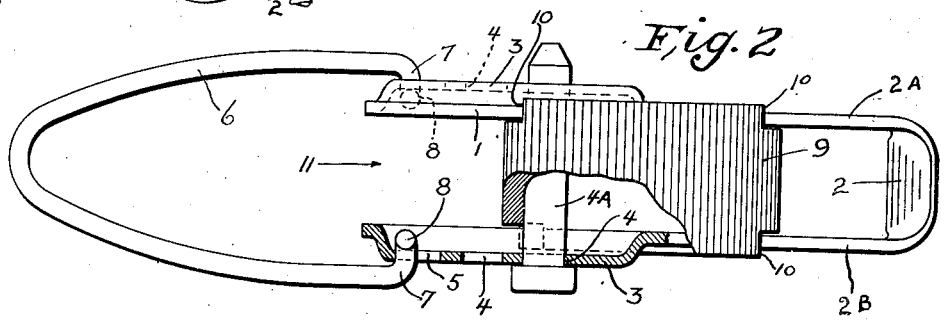
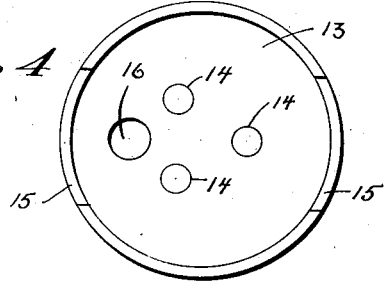
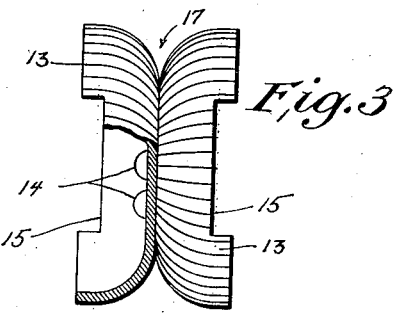
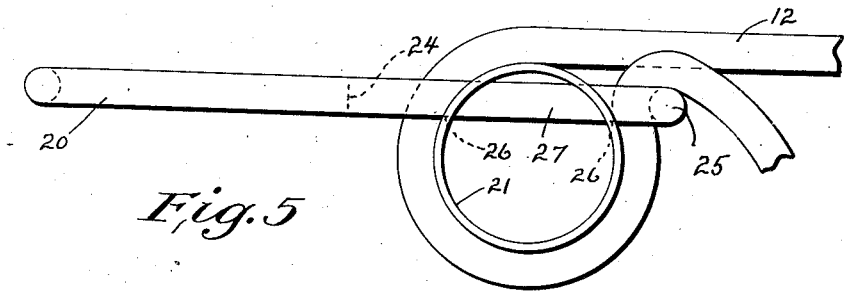
INVENTOR.
William O. Schultz
BY Chester W. T. Brown
ATTORNEY.

June 4, 1940.                W. O. SCHULTZ                2,203,066
CABLE ANCHORING DEVICE
Filed April 28, 1937           2 Sheets-Sheet 2
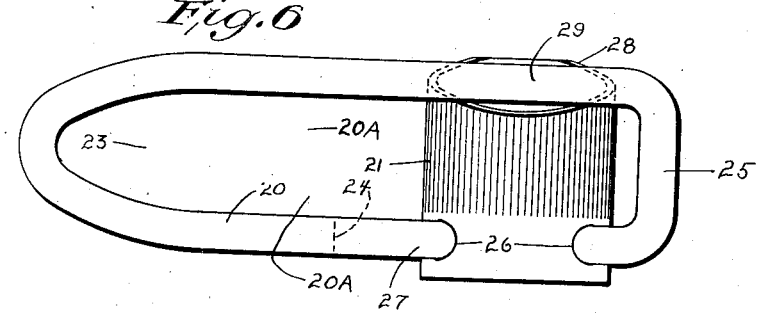
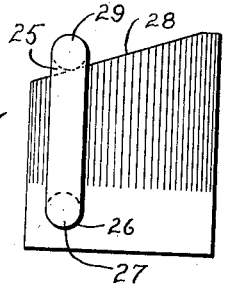
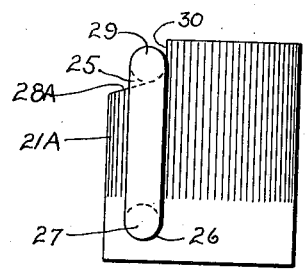
INVENTOR.
William O. Schultz
BY
Chester W. Brown
ATTORNEY.

Patented June 4, 1940

2,203,066

UNITED STATES PATENT OFFICE 2,203,066

CABLE ANCHORING DEVICE

William O. Schultz, South Milwaukee, Wis., assignor to Line Material Company, South Milwaukee, Wis., a corporation of Delaware Application April 28, 1937, Serial No. 139,485

6 Claims. (Cl. 24—136)

This invention relates to improvements in cable anchoring devices.

The principal object of this invention is to provide a cable anchoring device having a freely movable clamping member adapted to act as a snubbing element and to be actuated by the cable into clamping engagement therewith.

A further object is to provide in a cable anchoring device a freely movable clamping member having a grooved snubbing surface and movable under the influence of the cable to clamping engagement therewith, thereby increasing the grip of the snubbing surface upon the cable by reason of the clamping action.

Another object is to provide in a cable anchoring device a snubbing and clamping member which is movable relative to its coacting supporting element to a position permitting the cable to be looped about the member without interference by the supporting element and which may then be replaced in operative snubbing and clamping relation to the supporting element which serves as means for preventing disengagement of the cable laterally of the device.

It is also an object to provide a cable clamp which will permit the cable to be first formed into a loop at its anchoring end and then passed through an aperture in the device, the loop then receiving a snubbing and clamping member which will prevent removal of the loop from the aperture and automatically clamp the cable to the device under the influence of weight or tension of the cable.

Further objects are to provide a cable anchoring device comprising a minimum number of elements which are easily assembled and disassembled, which are tensioned relative to each other to prevent accidental separation during shipping and handling, and which, under the influence of stresses produced during actual use, are subjected to forces insuring that the elements will remain in operative engagement.

The following description will disclose a cable anchoring device from which a cable may be easily removed without mutilating the cable or the device and from which the cable may be easily released after shifting the stresses produced by the cable from the device.

In the drawings:

Fig. 1 is a view in side elevation illustrating a preferred form of this invention before it is suspended.

Fig. 1A is a view in side elevation of the device shown in Fig. 1, the view being reduced in size and illustrating the device approximately as it appears when operatively supporting a cable.

Fig. 2 is a top plan view of the device illustrated in Fig. 1.

Figs. 3 and 4 are respectively end and side views of a modified form of snubbing and clamping element adapted for use in the device illustrated in Figs. 1 and 2.

Fig. 5 is a side view in elevation illustrating a modified form of this invention.

Fig. 6 is a top plan view of the device shown in Fig. 5.

Fig. 7 is a right end view of the device shown in Fig. 5.

Fig. 8 is a view similar to Fig. 7 illustrating a modified form of snubbing and clamping element.

Like parts are identified by the same reference characters throughout the several views.

The device shown in Figs. 1, 1A, and 2 comprises a U-shaped slide member 1 having its apex formed with an arcuate serrated gripping or clamping surface 2 and its sides 2A and 2B each provided with a portion dished outwardly at 3 and provided with circular apertures 4 and an elongated aperture 5. Preferably, the member 1 is formed of an elongated strip of sheet metal.

Removably secured to the slide member 1 is a bail 6 having each of its ends bent inwardly at 7 through an adjacent aperture 5 in the slide member 1 and bent upwardly at 8. It will be noted that the upwardly bent portions 8 are less in length than the elongated apertures 5, thereby permitting removal of the bail 6 from the slide member 1 by passing the portions 8 through the apertures 5 when the bail is positioned to extend laterally upwardly relative to the slide member. The bail, of course, serves as a means for suspending the cable anchoring device when a cable is secured thereto.

As shown in Fig. 1A, the bail 6 is engaged with a hook 18 suitably mounted on a support diagrammatically shown at 19. Obviously, when so suspended, the stress of the cable 12 will put lateral forces upon the ends of the bail tending to draw them inwardly relative to the slide member 1, thereby compressing the free ends of the slide member and firmly securing all of the parts together.

During the manufacture of the device, the bail 6 is shaped so that in mounting it upon the slide member 1, the ends must be spread apart, thereby placing the bail under tension which will prevent its accidental removal from the member 1 during shipment and handling.

The dished portions 3 on the slide member 1 serve two purposes, namely, they conceal the ends of the bail so that element 9, subsequently described, may be removed and they serve to reinforce the arms of the member 1.

Slidably mounted on the slide member 1 is a tubular or circular snubbing and clamping element 9 which is preferably roughened on its outer periphery to provide a gripping surface of maximum resistance. As shown, each end of the element 9 is provided with diametrically related slots or grooves 10 receiving an adjacent arm of the slide member. Thus the element 9 may be entirely removed from the member 1 by sliding it off the open end 11 of the U-shaped member 1, or may be positioned at any desired position between the open end of the member 1 and the clamping surface 2.

If it is desired to temporarily retain the element against movement toward the gripping surface, a pin 4A may be passed through either pair of corresponding apertures and through the interior of the element 9. The element 9 is shown in dotted lines in Fig. 1 in clamping position. When the element 9 is in the dotted line position, the cable 12 has been passed over the element and between it and the clamping surface 2 and the pin 4A removed to allow free movement of the element 9 under the influence of the cable.

Obviously the greater the tension produced by the cable, the more firmly the element 9 and the clamping surface 2 will grip the cable, thereby insuring that the cable will not slip about the element 9 and be disengaged.

The cable 12 may be engaged with the device by removing the element 9 from the member 1 as previously described, looping the cable about the element 9, and then remounting the element upon the member 1 with the cable looped through the member, as shown.

Figs. 3 and 4 illustrate a modified form of snubbing and clamping element which may be substituted for the element 9 in Figs. 1 and 2. This element is made of two substantially identical cylindrical cup members 13 which are secured together as shown by means of rivets 14 or by spot welding in the well known manner. The margin of each member 13 is slotted or grooved at 15 on diametrical opposite sides for the reception of the arms of the U-shaped slide member 1 in a manner similar to that disclosed with reference to Figs. 1 and 2.

Each of the members 13 are apertured at 16 to receive a pin 4A (Fig. 1) when it is desired to secure the snubbing and clamping element against sliding on the member 1 in the same manner as previously noted with reference to the element 9 in Figs. 1 and 2.

From the disclosure in Fig. 3, it will be observed that the members 13 provide an annular V-shaped groove 17. This groove serves to firmly grip a cable therein when looped about the element as suggested with reference to Fig. 1. As in the disclosure in Fig. 2, the Fig. 3 snubbing and clamping element may be provided with roughened gripping surfaces to more firmly engage a cable.

The modification shown in Figs. 5, 6 and 7 comprises an elongated, generally rectangularly-shaped slide member 20 providing an elongated opening 20A for receiving the looped end of a cable and within which the snubbing and tubular clamping element 21 is movable. The member 20 is preferably formed of round stock. After the rod has been bent to the shape indicated, the ends are brought together at 24 and welded.

The end 25 of the member 20 serves as a clamping portion cooperating with the element 21 to prevent slipping of a cable about the element when anchored thereto. When the element 21 is disposed between the sides 27 and 29, the axis about which the element 21 is generated extends transversely to the sides 27 and 29.

As clearly shown in Fig. 5, the element 21 is preferably made of tubing and is provided at one end with a pair of concentric apertures 26, the axes of which are transversely extended relative to the axis of the tube and are laterally to one side of the tube axis. These apertures receive one side 27 of the member 20. The opposite end 28 of the member 21 is cut at a bevel and serves as a contact margin engaging the side 29 of the member 20 and preventing the pivotal movement of the element 21 in one direction but permitting it in the other direction.

From the foregoing it will be seen that in the device shown in Figs. 5 through 8, the element 21 is capable of being moved in two general directions relative to the slide, namely, longitudinally relative to the slide member and transversely in a plane normal to longitudinal direction of movement or to the slide member.

A cable is anchored to the device disclosed in Figs. 5, 6 and 7 as follows, reference being made specifically to Fig. 5. The cable 12 is formed into a loop which is passed through the opening 20A after withdrawing the element 21 from the opening by pivotal movement downwardly about the side 27 of the member 20. When the loop is passed through the opening, the element 21 is moved into the loop so that when it is disposed as indicated in Fig. 5, the cable will pass over and beneath the element and then upwardly between the element 21 and the clamping portion 25 on the member 20.

As clearly indicated in Fig. 5, the main portion of the element 21 is disposed below the member 20 so that it will be drawn upwardly with its angular margin 28 engaging the side 29 of the member 20. Obviously, if the cable is under tension, it will cause the element 21 to slide toward the clamping portion 25 and securely hold the cable against withdrawal.

The snubbing and clamping element 21A shown in Fig. 8 is the modification of that shown in Figs. 5, 6 and 7 in that the beveled margin 28A terminates in a shoulder 30 which engages the side 29 of the member 20 and minimizes any tendency to spread the sides of the member. Otherwise the device illustrated in Fig. 8 operates the same as that described with reference to Figs. 5, 6 and 7.

From the foregoing disclosure, it will be apparent that a cable anchoring device has been provided in which a combined snubbing and clamping action is secured by means of a single element movably supported upon a clamping member, that a device has been provided in which tension upon a cable is utilized to cause clamping engagement therewith, that a device has been provided in which the movable snubbing and clamping element may be moved to a position relative to its support permitting the looped end of a cable to be passed through the support and engaged with the element for movement therewith to clamping engagement with the support, and that a simple comparatively inexpensive and efficient device has been provided which comprises a minimum number of easily manipulated parts.

I claim:

1. In a cable anchoring device, the combination with a member having spaced sides and a clamping portion between said sides at one end thereof, of a snubbing element having an annular snubbing surface disposed between said sides and having slide grooves engaging said sides, whereby said element is freely movable toward said portion but non-rotative relative to said member.

2. In a cable anchoring device, the combination with a U-shaped slide member, the sides of said member serving as slides and the apex serving as a clamping portion, of a snubbing element having slide grooves receiving said sides, whereby a tensioned cable looped about said element and between said element and portion will be securely snubbed and clamped to said device, and a bail member secured to the ends of said sides remote from said clamping portion and providing with said member an open end permitting removal of said element from said member.

3. In a cable anchoring device, the combination with a U-shaped slide member having substantially parallel sides comprising slides and an apex comprising a clamping portion, of a tubular element having its axis extending between said sides and having each end provided with diametrically related slots embracing an adjacent side, and a bail pivotally secured to the ends of said sides remote from said apex and providing with said member on an open end permitting removal of said element from said member.

4. In a cable anchoring device, the combination with a U-shaped slide member comprising a length of bent sheet metal having a curved clamping portion intermediate its ends and substantially parallel spaced arms extending from said portion, said arms each having an outwardly dished portion remote from said clamping portion, of a circular snubbing element between said arms having slide grooves embracing said arms, the curve of said clamping portion being outwardly relative to said element, and a bail pivotally secured to the dished portion of each arm, said bail permitting free removal of said element from said member at the ends of said arms remote from said clamping portion.

5. In a cable anchoring device, the combination with a U-shaped slide member providing substantially parallel arms and a clamping portion at its apex, of a circular snubbing element between said arms and having slide grooves embracing said arms, said arms and element being apertured to receive a pin for holding said element a predetermined distance relative to said clamping portion, and a bail secured to the ends of said arms remote from said clamping portion and providing with said member an open end permitting removal of said element from said member.

6. The combination with a cable, of a cable-anchoring device including a snubbing element having a circular snubbing surface, a slide member having parallel spaced sides extending across opposite ends of said element in a plane intersecting said surface and having a snubbing portion connecting said sides and extending in a direction substantially parallel to the axis about which said surface is generated, and means on said element slidably engaging said element with said member and holding said element against rotation about said axis, said cable extending over said snubbing portion, about said snubbing surface and between said surface and snubbing portion.

WILLIAM O. SCHULTZ.